United States Patent
Kori et al.

(10) Patent No.: US 7,847,456 B2
(45) Date of Patent: Dec. 7, 2010

(54) PERMANENT MAGNET ELECTRICAL ROTATING MACHINE, WIND POWER GENERATING SYSTEM, AND A METHOD OF MAGNETIZING A PERMANENT MAGNET

(75) Inventors: Daisuke Kori, Hitachinaka (JP); Tetsuo Fujigaki, Hitachi (JP); Shuji Aizawa, Hitachi (JP); Motonobu Iizuka, Hitachi (JP); Yasushi Iwai, Mito (JP); Hiroyuki Mikami, Hitachinaka (JP); Mamoru Kimura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/754,047

(22) Filed: Apr. 5, 2010

(65) Prior Publication Data

US 2010/0194221 A1 Aug. 5, 2010

Related U.S. Application Data

(63) Continuation of application No. 11/943,894, filed on Nov. 21, 2007.

(30) Foreign Application Priority Data

Nov. 24, 2006 (JP) .............................. 2006-316444

(51) Int. Cl.
*H02K 1/27* (2006.01)
(52) U.S. Cl. ............................ 310/156.01; 310/156.53; 310/156.36; 310/216.119; 310/61
(58) Field of Classification Search .................................
310/156.36–156.47, 53, 56, 156.01, 156.49,
310/156.57, 216.069, 216.071, 216.072,
310/216.073, 216.119, 61; 335/284
See application file for complete search history.

(56) References Cited

U.S. PATENT DOCUMENTS 5,663,605 A * 9/1997 Evans et al. .................. 310/181
5,753,989 A * 5/1998 Syverson et al. ............ 310/114
5,811,904 A * 9/1998 Tajima et al. .......... 310/156.45

(Continued)

FOREIGN PATENT DOCUMENTS

CN 2237899 Y 10/1996

(Continued)

OTHER PUBLICATIONS

U.S. Appl. No. 11/943,894, filed Nov. 21, 2010, Daisuke Kori et al., Hitachi, Ltd.

(Continued)

*Primary Examiner*—Quyen Leung
*Assistant Examiner*—Naishadh N Desai
(74) *Attorney, Agent, or Firm*—Antonelli, Terry, Stout & Kraus, LLP.

(57) ABSTRACT

A permanent magnet electrical rotating machine having a permanent magnet rotor and a stator, wherein:

a plurality of permanent magnets are disposed in a rotor iron core of the permanent magnet rotor along a periphery of the rotor iron core, polarities thereof being alternately changed;

a cooling airflow channel is formed between each pair of adjacent opposite poles on the rotor iron core; and the cooling airflow channel has an approximately trapezoidal shape on an outer periphery side of the rotor iron core; and extends from an end on a central side in a radial direction of the approximately trapezoidal shape to a radial center.

20 Claims, 14 Drawing Sheets

U.S. PATENT DOCUMENTS

| | | | |
|---|---|---|---|
| 6,441,524 B2 * | 8/2002 | Kaneko et al. | 310/156.45 |
| 6,525,442 B2 * | 2/2003 | Koharagi et al. | 310/156.48 |
| 6,847,144 B1 | 1/2005 | Luo | |
| 7,605,510 B2 * | 10/2009 | Okuma et al. | 310/156.53 |
| 7,619,332 B2 * | 11/2009 | Kimura et al. | 310/58 |
| 2001/0043020 A1 * | 11/2001 | Nishiyama et al. | 310/156.01 |
| 2002/0175583 A1 * | 11/2002 | Kikuchi et al. | 310/156.56 |
| 2002/0175584 A1 * | 11/2002 | Koharagi et al. | 310/156.56 |
| 2003/0067236 A1 | 4/2003 | Takahata et al. | |
| 2003/0067237 A1 | 4/2003 | Takahata et al. | |
| 2003/0117032 A1 | 6/2003 | Komuro et al. | |
| 2005/0093390 A1 | 5/2005 | Komuro et al. | |
| 2006/0017345 A1 * | 1/2006 | Uchida et al. | 310/156.56 |
| 2006/0055267 A1 * | 3/2006 | Arimitsu et al. | 310/156.53 |
| 2006/0071568 A1 | 4/2006 | Kimura et al. | |
| 2007/0024129 A1 | 2/2007 | Pfannschmidt et al. | |

FOREIGN PATENT DOCUMENTS

| | | |
|---|---|---|
| CN | 1411126 A | 4/2003 |
| CN | 1428915 A | 7/2003 |
| CN | 1756038 A | 4/2006 |
| CN | 1784818 A | 6/2006 |
| JP | 2006-081377 | 3/2006 |

OTHER PUBLICATIONS

Office Action issued in Chinese Patent Application No. 2007101936729 on Feb. 5, 2010.

Office Action issued in Chinese Patent Application No. 2007101936729 on Aug. 4, 2010.

* cited by examiner

GAP1 = GAP2
GAP1 > GAP3

GAP1 > GAP2 > GAP3

PERMANENT MAGNET ELECTRICAL ROTATING MACHINE, WIND POWER GENERATING SYSTEM, AND A METHOD OF MAGNETIZING A PERMANENT MAGNET

CLAIM OF PRIORITY

This application is a continuation of application Ser. No. 11/943,894, filed Nov. 21, 2007, currently pending, which claims the benefit from Japanese Application Serial No. 2006-316444, filed on Nov. 24, 2006, the disclosures of which are incorporated herein by reference.

BACKGROUND OF THE INVENTION

1. Field of the Invention

The present invention relates to a permanent magnet electrical rotating machine, a wind power generating system, and a method of magnetizing a permanent magnet.

2. Prior Art

The amount of electricity produced by wind power has greatly increased in recent years. There have been increasing demands for permanent magnet-type machines with a large capacity of 1 MW or more to improve the economy by increasing the capacity of a single machine. Although the efficiency of a large-capacity permanent magnet-type machine is high, the value of its loss is large. When the body of an electrical rotating machine is enlarged so as to suppress the heat generation density to a level nearly equal to that of a small-capacity machine, the weight has to be increased and thus the manufacturing cost and construction cost are increased, making it necessary to increase the heat generation density with a small body. However, a high heat generation density requires high cooling performance, resulting in an increase in cost. If the structure does not readily generate heat, the electric characteristics are lowered and it becomes difficult for the permanent magnet electrical rotating machine to meet the requirements of an electric power generator. To achieve high-efficiency cooling at a low cost without the electric characteristics being sacrificed, a structure suitable for being efficiently cooled is necessary.

In the Patent Document 1, heat generation between poles is suppressed by providing a gap between the poles to reduce a magnetic flux leak.

Patent Document 1: Japanese Patent application Laid-open No. 2006-81377

SUMMARY OF THE INVENTION

The patent document 1 describes a technology that prevents a magnetic flux from leaking between poles to suppress heat generation between the poles just by providing a gap between the poles. However, the patent document 1 does not describe air-cooling of a rotor during rotation thereof.

The present invention provides a rotor that is structured so as to be suitable for being air-cooled while the rotor is rotating.

The object of the present invention is to provide a permanent magnet electrical rotating machine enable to cool a heated electric power generator more sufficiently, and achieve an inexpensive structure by reduced in size.

In an electrical rotating machine for wind power generation system of the present invention: a plurality of permanent magnets are disposed in a rotor iron core of a permanent magnet rotor along the periphery of the rotor iron core, their polarities being alternately changed; a cooling airflow channel is provided between each pair of adjacent opposite poles; the cooling airflow channel has an approximately trapezoidal shape on the outer periphery side of the rotor iron core; a groove is provided, which extends from an outer end side in a radial direction of the approximately trapezoidal shape to an axial center.

The present invention provides a permanent magnet electrical rotating machine enable to be readily cooled a heated electric power generator, and achieve an inexpensive structure by reduced in size.

DETAILED DESCRIPTION OF THE INVENTION

Figure 1:
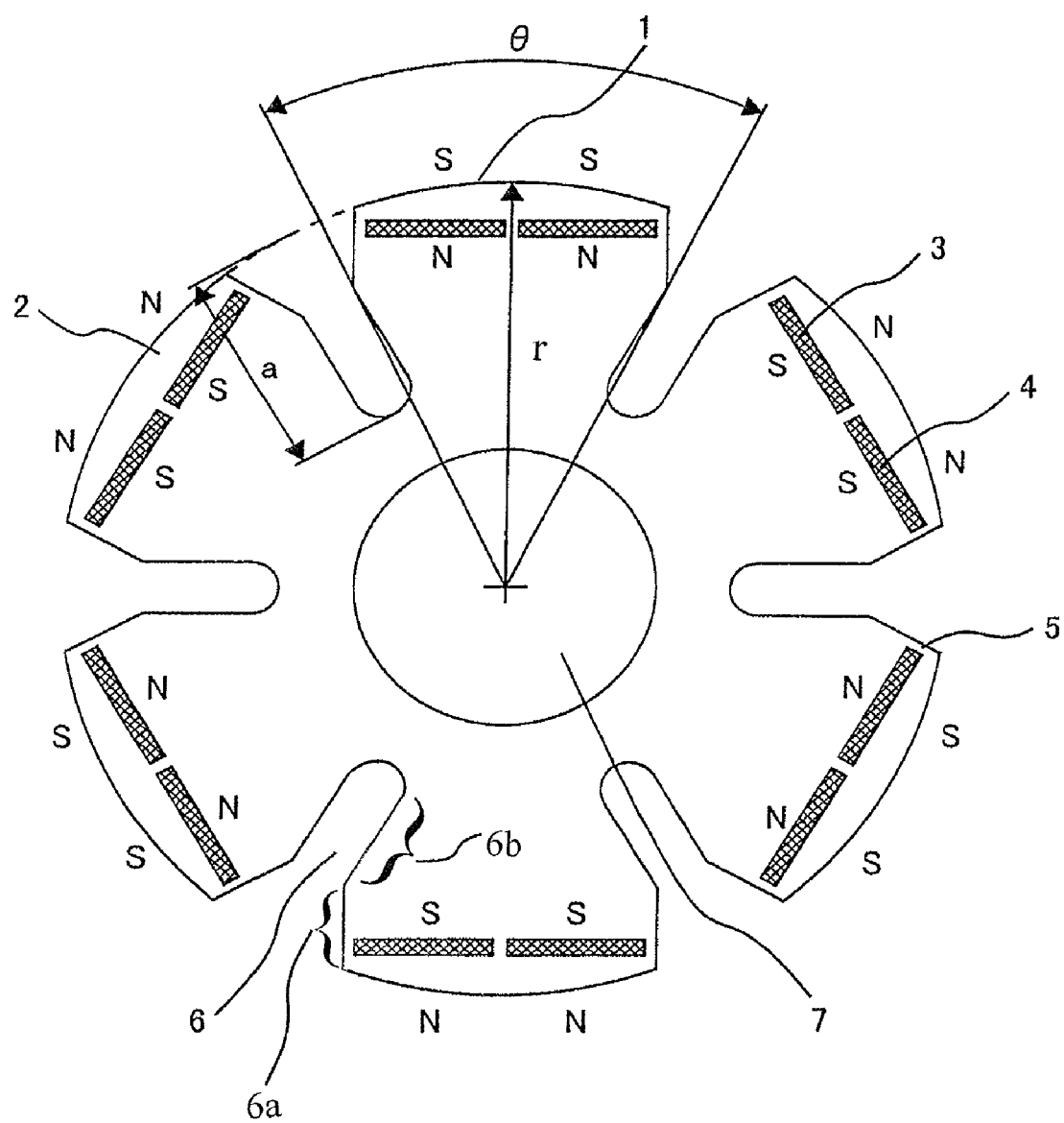
FIG. 1 illustrates a cross-sectional view showing a rotor iron core of a permanent magnet electrical rotating machine in a first embodiment of the present invention.

Permanent magnet electrical rotating machines of the embodiments in the present invention will be described in details with reference to the drawings. The identical parts in the drawings are assigned the same reference numerals.

First Embodiment

FIG. 1 is a cross-sectional view showing an end of a permanent magnet rotor of a six-pole permanent magnet electrical rotating machine in a first embodiment of the present invention. The permanent magnet rotor 1 comprises a rotor iron core 2, permanent magnets 3 and 4 being seated in permanent magnet slots 5 formed in the rotor iron core 2. Two permanent magnets 3 and 4 are provided for each pole. The rotor iron core 2 has a radius r and each pole of the rotor iron core 2 in radial direction has end with the angle θ.

Figure 2:
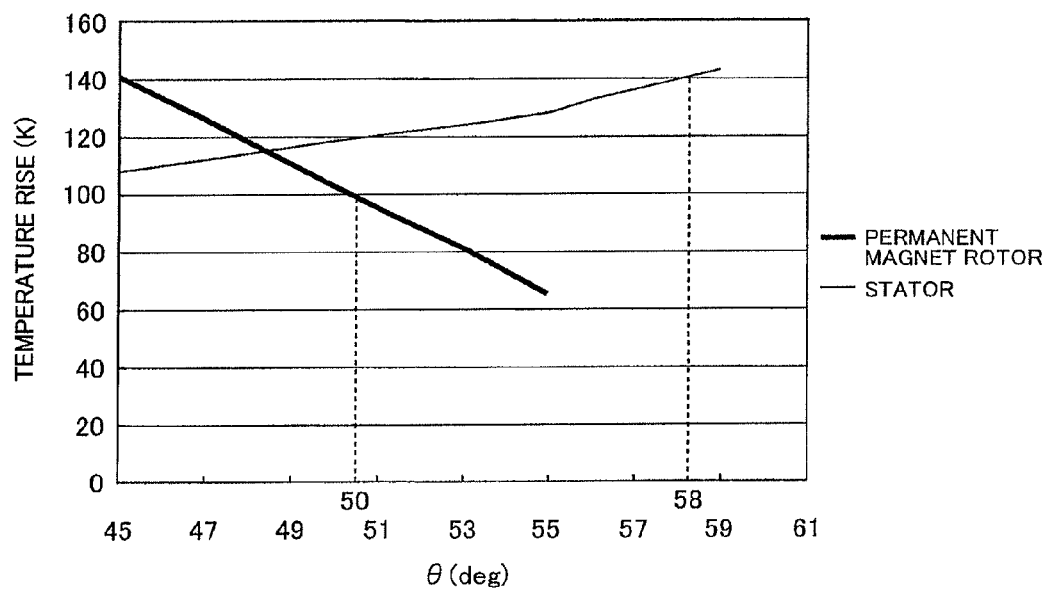
FIG. 2 is a graph representing cooling performance of the rotor iron core of the permanent magnet electrical rotating machine shown in FIG. 1.
Figure 3:
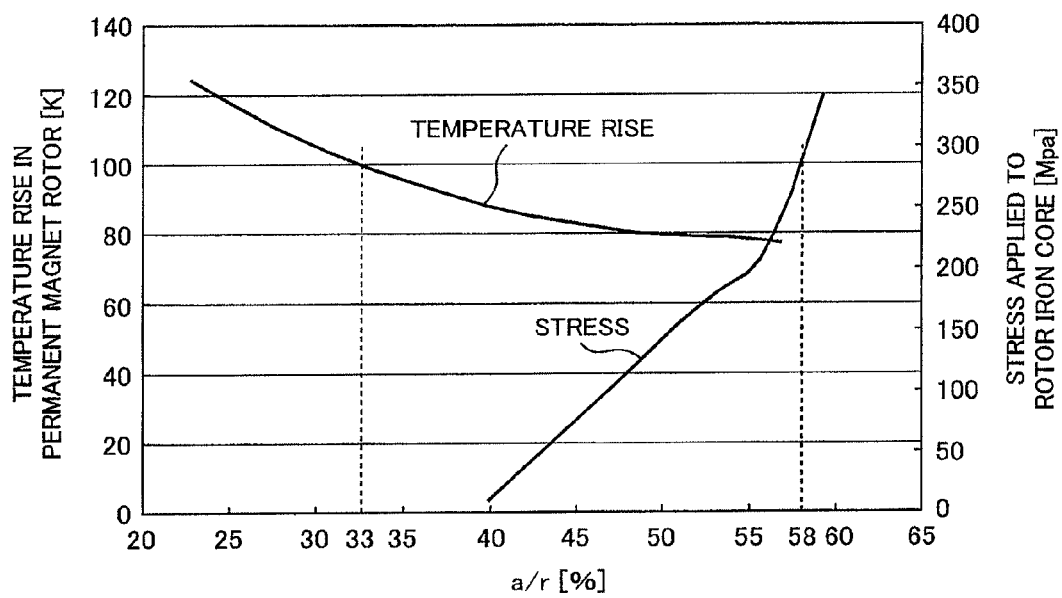
FIG. 3 is another graph representing cooling performance of the rotor iron core of the permanent magnet electrical rotating machine shown in FIG. 1.

The permanent magnet rotor 1 also has a cooling airflow channel 6 between poles through which cooling air is made to flow to efficiently cool the inside of an electrical power generator. As shown in FIG. 1, the cooling airflow channel 6 has a groove formed an approximately trapezoidal shape on the outer periphery side of the rotor iron core 2, which extends from an outer end side in a radial direction of the approximately trapezoidal shape to a radial center. FIGS. 2 and 3 show the results of investigation of the cooling performance in this structure, indicating that cooling is efficiently carried out.

As shown in FIG. 1, the cooling airflow channel 6 includes a mouth portion 6a at an outer periphery of the rotor iron core, and a stem portion 6b which is extended from the mouth portion 6a, in a radial direction, to a radial center of the rotor iron core 2. The mouth portion 6a of the cooling airflow channel 6 has a width that expands from the stem portion 6b, in the radial direction, to the end of the outer periphery of the rotor iron core 2, so as to receive and circulate the cooling airflow in the radial direction, via the stem portion 6b, to the radial center of the rotor iron core 2.

FIG. 2 shows the relationship between angle θ formed by ends on the inner diameter side, by which the width of one pole of the rotor iron core 2 shown in FIG. 1 is determined, and the temperature rise of the stator. In FIG. 1, each pole of the rotor iron core 2 has two ends in radial directions; if it has only one end, the angle of the end is θ. According to FIG. 2, when θ is 50° or more, the temperature rise of the permanent magnet can be suppressed to 100 K or below and thus to the demagnetizing temperature or below; when θ is 58° or less, the maximum temperature rise allowed for an H-type winding of the stator can be suppressed to 140 K or below, 140 K being the upper limit of the temperature rise of the H-type winding made of a standard wire.

Accordingly, for the width of the cooling airflow channel 6 in the peripheral direction on its inner diameter side, the angle θ formed by the ends, on the inner diameter side, of the width of one pole of the rotor iron core 2 is preferably 50° or more but 58° or less.

FIG. 3 shows the relationship among the depth "a" of the cooling airflow channel 6, shown in FIG. 1, in the radial direction to the radius "r" of the rotor iron core 2, the temperature rise in the permanent magnet rotor 1, and the stress applied to the rotor iron core 2. When the ratio a/r is 33% or more ("a" is the optimum depth of the cooling airflow channel 6, shown in FIG. 1, in the radial direction and "r" is the radius of the rotor iron core 2), the temperature rise of the permanent magnet can be suppressed to 100 K or below and thus to the demagnetizing temperature or below; when the ratio a/r is 58% or less, the rotor iron core 2 can be used without exceeding the yield stress applied to its material.

Accordingly, for the depth "a" of the cooling airflow channel 6 in the radial direction, the ratio a/r to the radius "r" of the rotor iron core 2 is preferably 33% or more but 58% or less.

When the cooling airflow channel 6 shown in FIG. 1 is used, the heat generation density of the electrical power generator can be decreased and its body can be structured small. The rotor iron core 2 is connected to a shaft 7. Although this rotor iron core 2 is used for six-pole permanent magnet electrical rotating machine in FIG. 1, it should be understood that this embodiment can be practiced with another number of poles.

Second Embodiment

Figure 4:
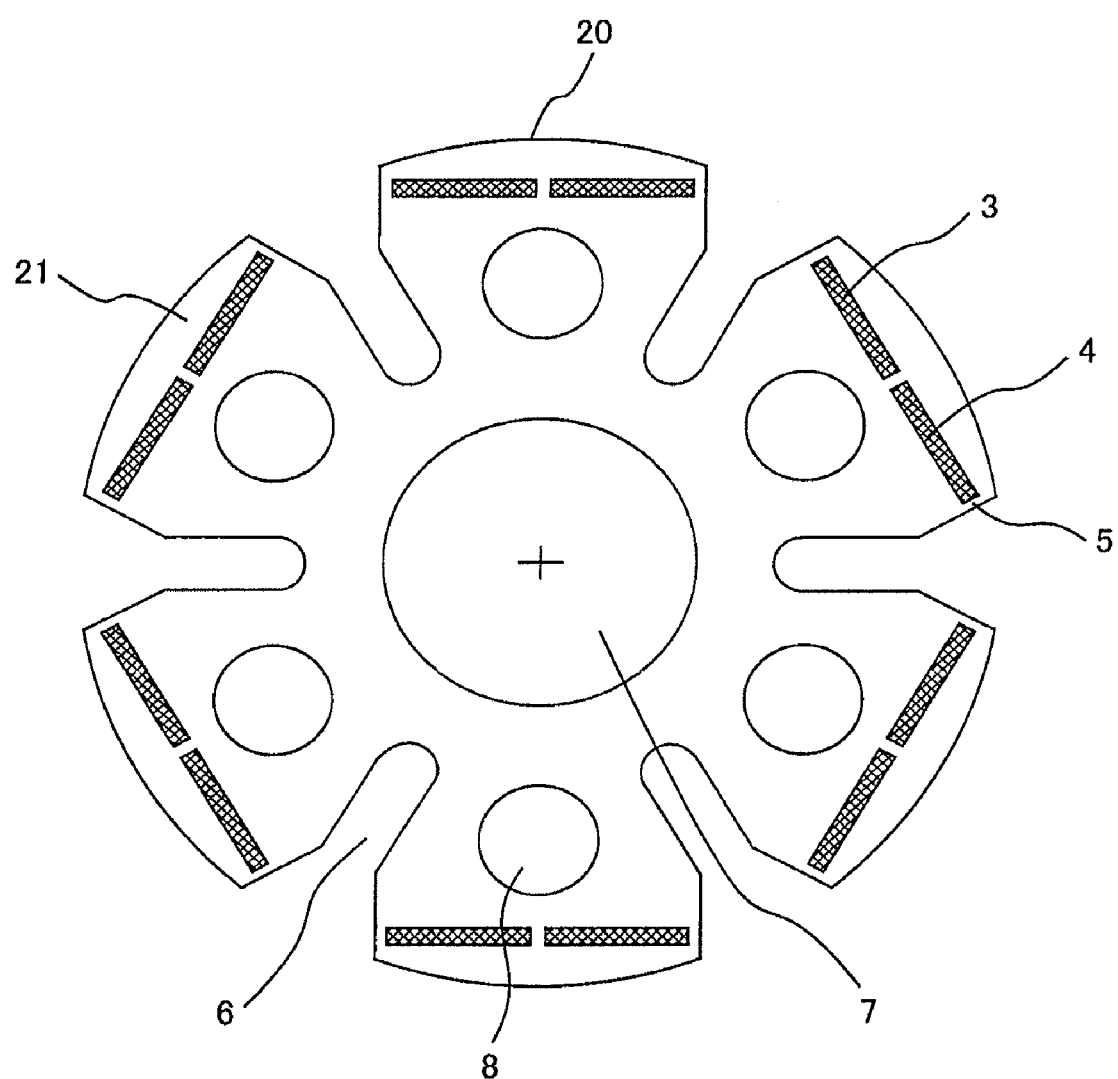
FIG. 4 illustrates a cross-sectional view showing a rotor iron core of a permanent magnet electrical rotating machine in a second embodiment of the present invention.

FIG. 4 is a cross-sectional view showing an end of a permanent magnet rotor of a six-pole permanent magnet electrical rotating machine in a second embodiment of the present invention. As in the first embodiment, a permanent magnet rotor 20 comprises a rotor iron core 21, permanent magnets 3 and 4 being seated in permanent magnet slots 5 formed in the rotor iron core 21. Two permanent magnets are provided for each pole. The permanent magnet rotor 20 also has a cooling airflow channel 6 between poles through which cooling air is made to flow to efficiently cool the inside of the electrical power generator. An airflow cooling axial duct 8 is provided for each pole inside the permanent magnets 3 and 4 in the rotor iron core 21 toward the axial direction; cooling air can be made to flow through the airflow cooling axial duct 8 as well. The rotor iron core 21 is connected to the shaft 7. Although, in FIG. 4, the airflow cooling axial duct 8 is provided only at a single location for each pole, a plurality of airflow cooling axial ducts 8 can also be provided in the same way. Although the airflow cooling axial duct 8 shown in FIG. 4 is circular shape, however, it may have another shape.

Figure 5:
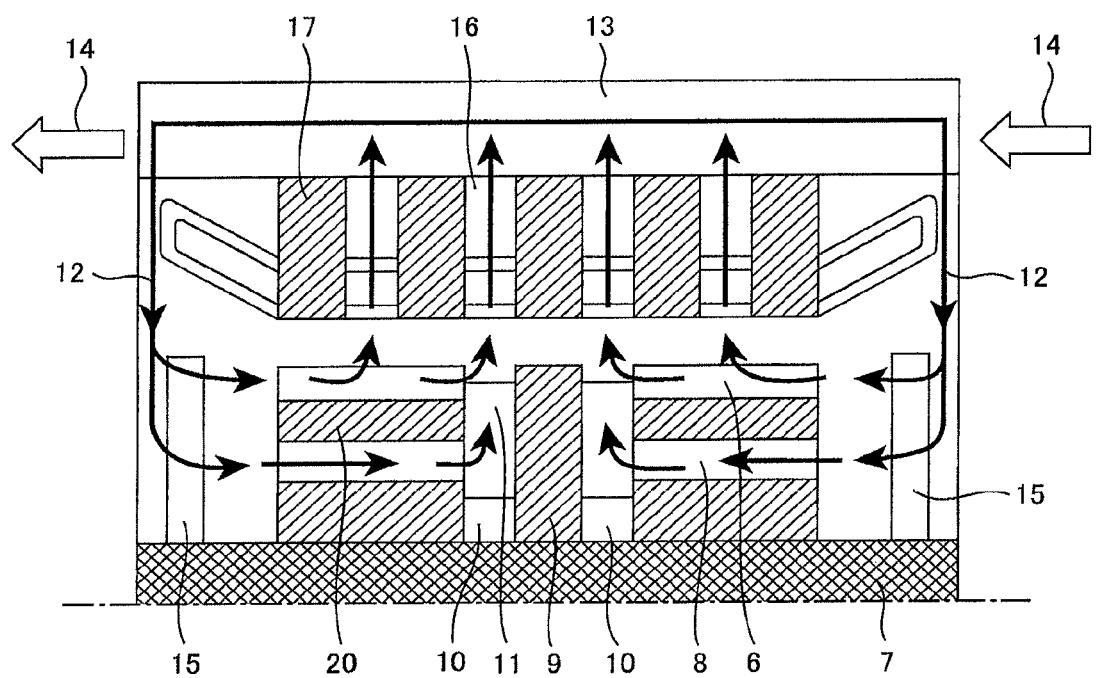
FIG. 5 illustrates a cross-sectional view in the axial direction of the permanent magnet electrical rotating machine in the second embodiment of the present invention.

FIG. 5 illustrates a half of the cross-sectional view in the axial direction of the permanent magnet electrical rotating machine in the second embodiment of the present invention. In a cooling air flow 12, air cooled by outside air 14 in an air cooler 13 is passed through the cooling airflow channel 6 and airflow cooling axial duct 8 by a fan 15 connected to the shaft 7 of the permanent magnet electrical rotating machine. The cooled air shown as the air flow 12 is further passed from a duct space 11 of the rotor 20 defined between duct pieces 10 radially disposed on an intermediate spacer 9 to a duct space 16 of the stator 17, and enters the air cooler 13, then the air flow 12 is circulated. The duct space 11 enables the central part of the electrical power generator to be effectively cooled.

Figure 6:
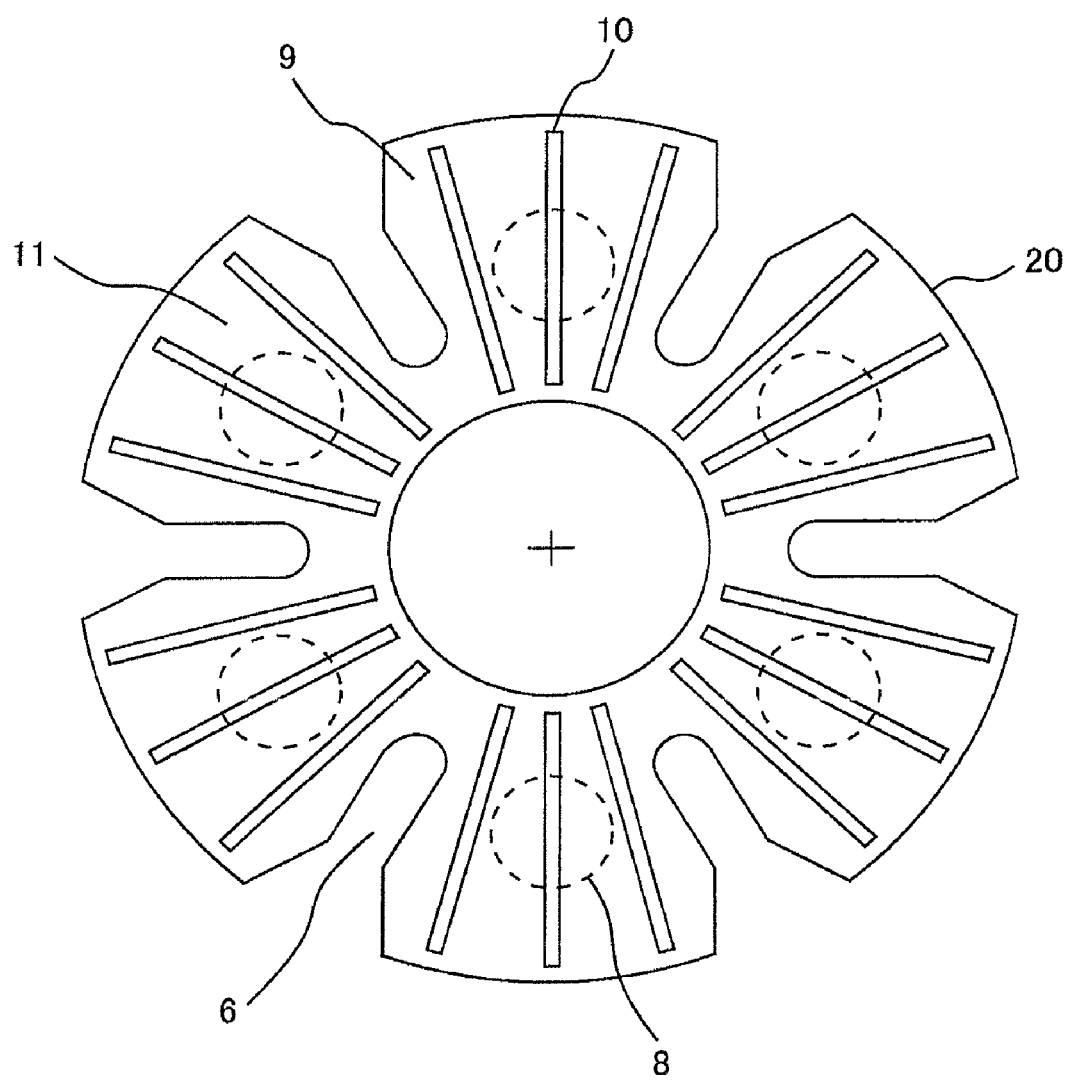
FIG. 6 illustrates a cross-sectional view showing an intermediate spacer of the permanent magnet electrical rotating machine in the second embodiment of the present invention.

FIG. 6 shows the cross-section of the intermediate spacer 9 of the permanent magnet rotor 20 of the permanent magnet electrical rotating machine in the second embodiment of the present invention, as viewed in a radial direction. The cooling air passes through the airflow cooling axial ducts 8 on which duct pieces 10 are radially disposed on both sides of the intermediate spacer 9, hits the intermediate spacer 9, which is disposed at the axial center of the permanent magnet rotor 20 or shifted toward exhaust side of the air cooler 13, passes through the duct spaces 11, and exits to the stator side.

Accordingly, the central part of the permanent magnet electrical rotating machine can be more efficiently cooled.

Figure 7:
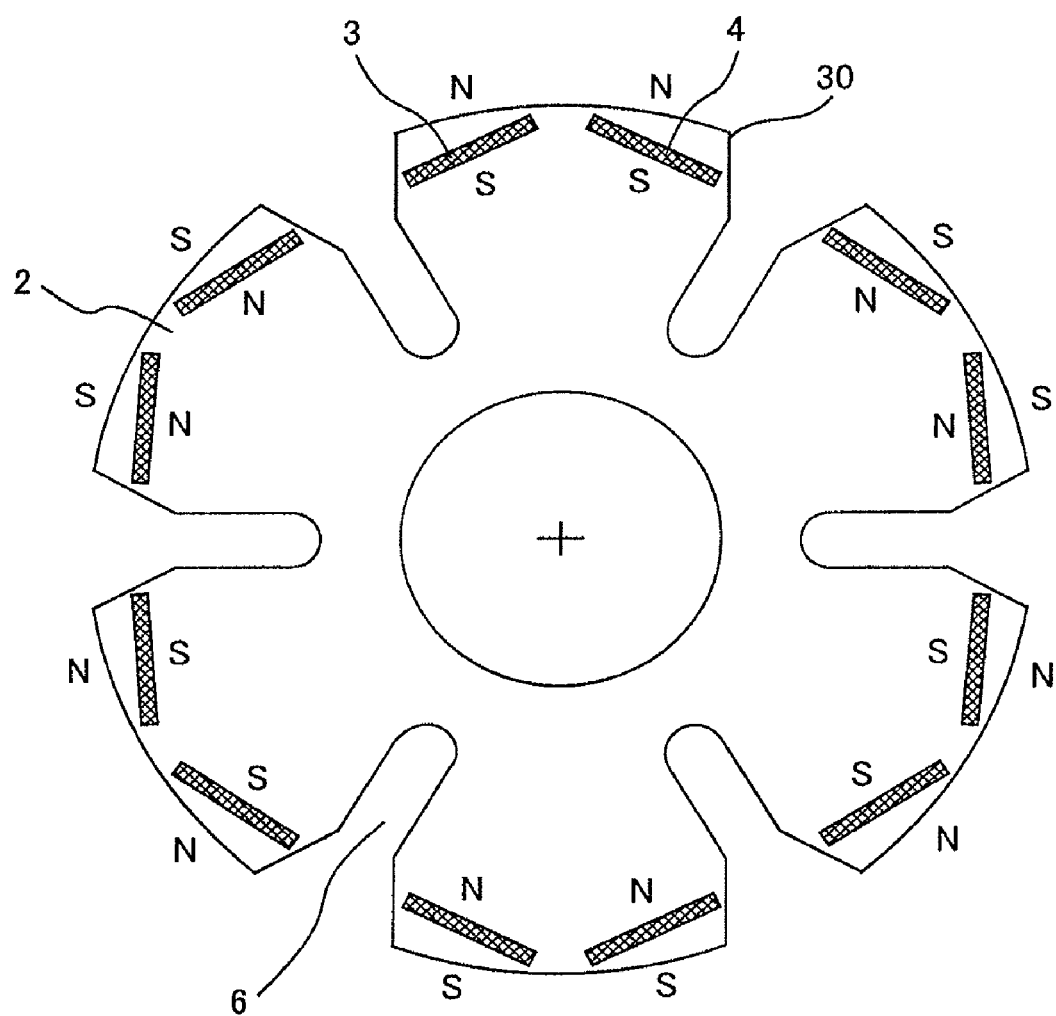
FIG. 7 illustrates a cross-sectional view showing a rotor iron core of the permanent magnet electrical rotating machine in the first and the second embodiments of the present invention.

The permanent magnet rotor 1 of the permanent magnet electrical rotating machine in the first and second embodiments may use a permanent magnet rotor 30, as shown in FIG. 7, in which at least two flat-plate permanent magnets 3 and 4 are provided for each pole in such a way that they are disposed in a reverse V shape and identical poles face the outer periphery in a radial direction, as viewed from the inner periphery of the permanent magnet rotor 1.

Figure 8:
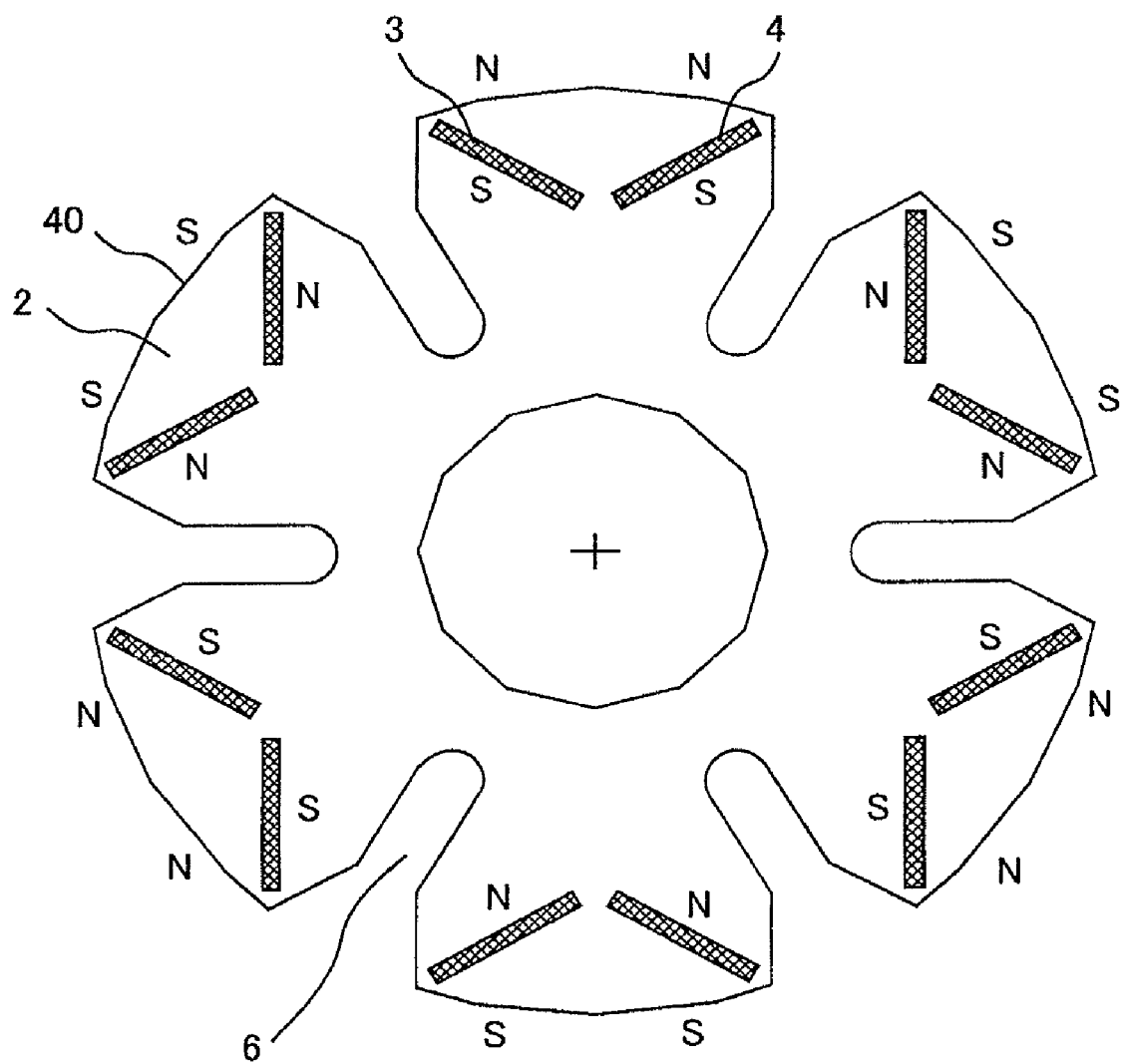
FIG. 8 illustrates a cross-sectional view showing another rotor iron core of the permanent magnet electrical rotating machine in the first and the second embodiments of the present invention.

The permanent magnet rotor 1 of the permanent magnet electrical rotating machine in the first and second embodiments may use a permanent magnet rotor 40, as shown in FIG. 8, in which at least two flat-plate permanent magnets 3 and 4 are provided for each pole in such a way that they are disposed in a V shape and identical poles face the outer periphery in a radial direction, as viewed from the inner periphery of the permanent magnet rotor 1.

Figure 9:
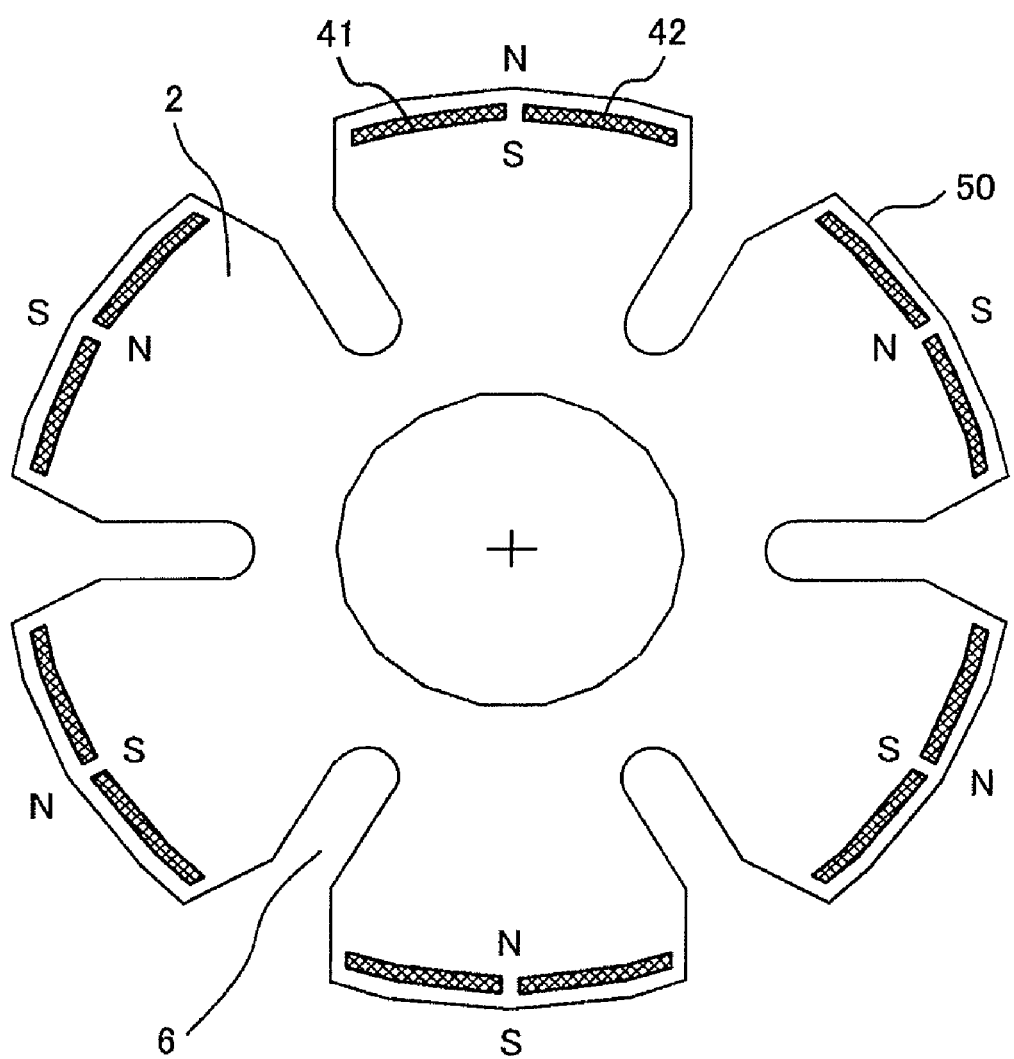
FIG. 9 illustrates a cross-sectional view showing other rotor iron core of the permanent magnet electrical rotating machine in the first and the second embodiments of the present invention.

The permanent magnet rotor 1 of the permanent magnet electrical rotating machine in the first and second embodiments may use a permanent magnet rotor 50, as shown in FIG. 9, in which at least two arc-shaped permanent magnets 41 and 42 are provided for each pole in such a way that they are disposed along the outer periphery of the permanent magnet rotor 50 and identical poles face the outer periphery in a radial direction, as viewed from the inner periphery of the permanent magnet rotor 1.

Figure 10:
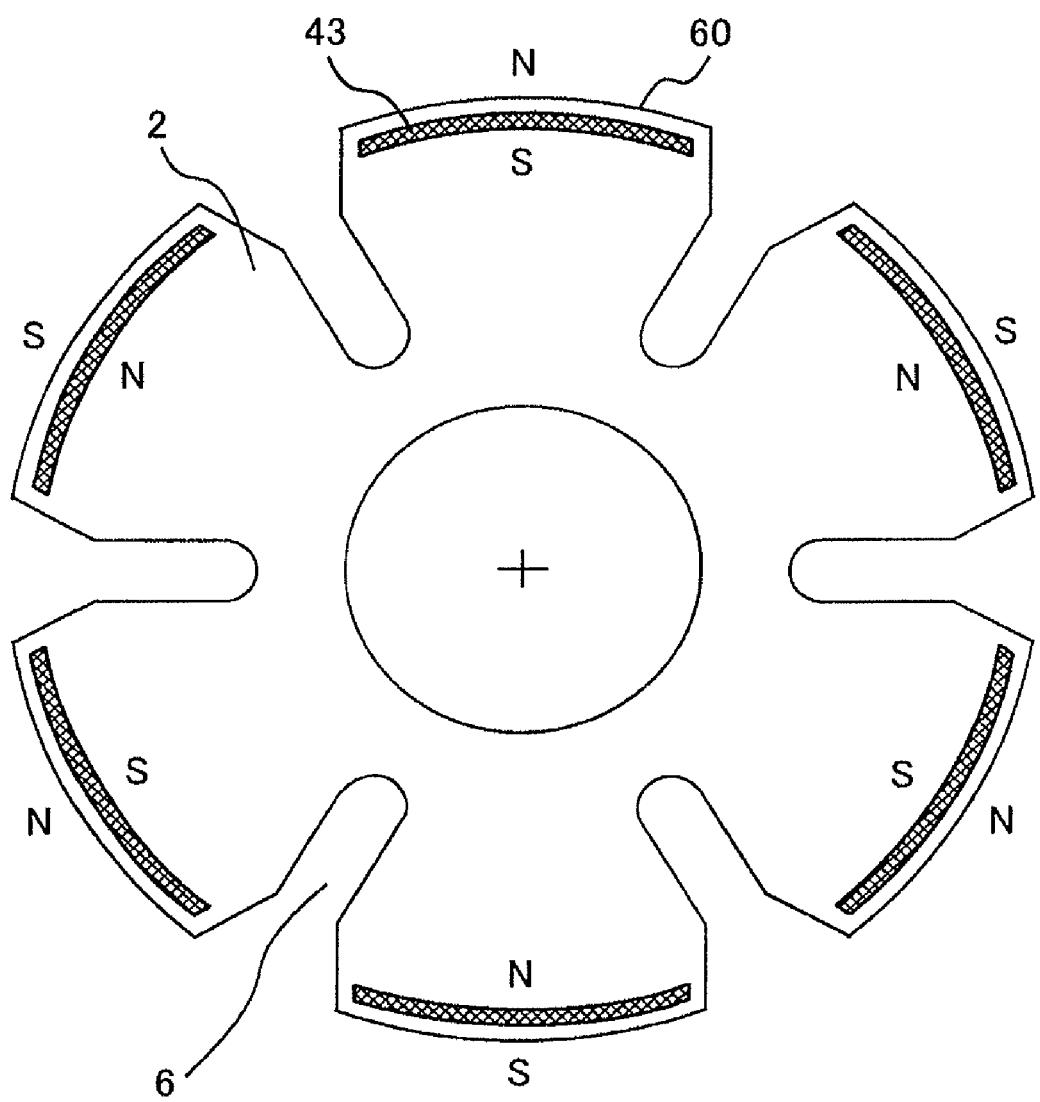
FIG. 10 illustrates a cross-sectional view showing other rotor iron core of the permanent magnet electrical rotating machine in the first and the second embodiments of the present invention.
Figure 11:
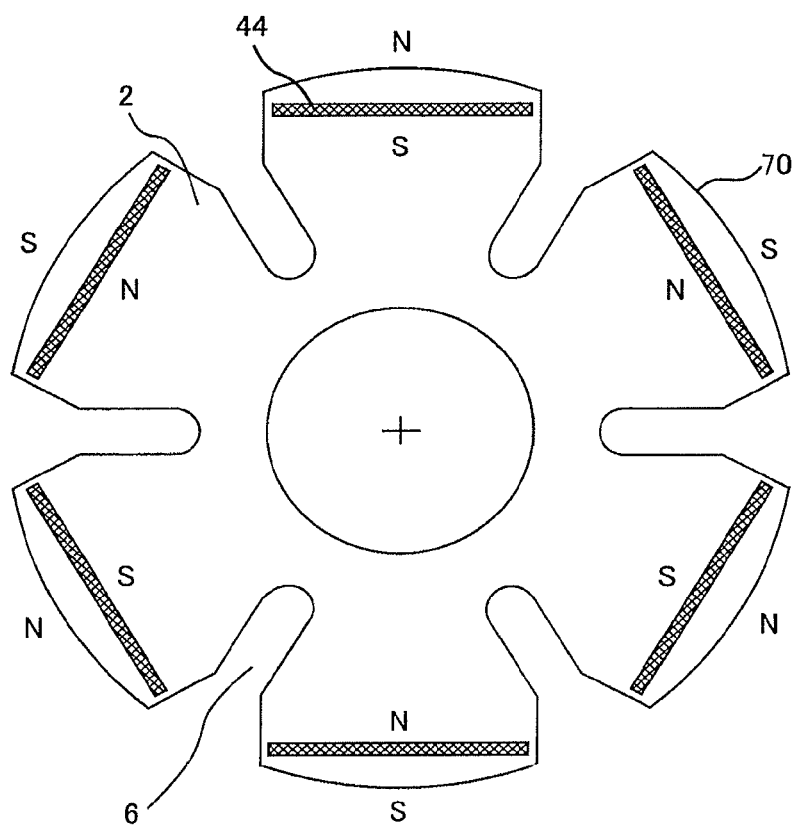
FIG. 11 illustrates a cross-sectional view showing other rotor iron core of the permanent magnet electrical rotating machine in the first and the second embodiments of the present invention.

The permanent magnet rotor 1 of the permanent magnet electrical rotating machine in the first and second embodiments may use a permanent magnet rotor 60, as shown in FIG. 10, in which a single arc-shaped permanent magnet 43 is disposed per pole along the outer periphery of the permanent magnet rotor 60 without being divided, or may use a permanent magnet rotor 70, as shown in FIG. 11, on which a single flat-plate permanent magnet 44 is disposed per pole in parallel without being divided, as viewed from the inner periphery of the permanent magnet rotor 1.

Figure 12:
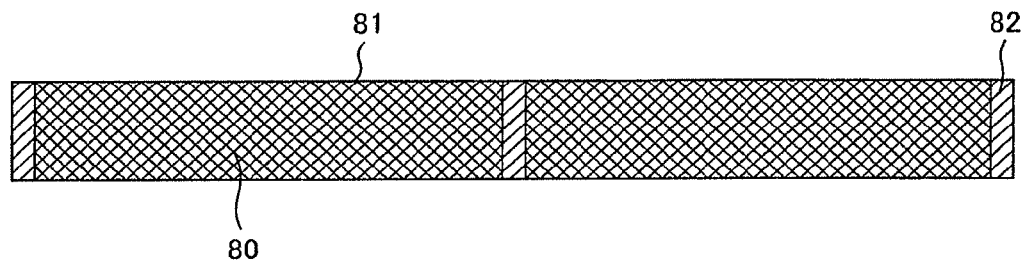
FIG. 12 illustrates a fixed method of the permanent magnet the permanent magnet electrical rotating machine in the first and the second embodiments of the present invention.
Figure 13:
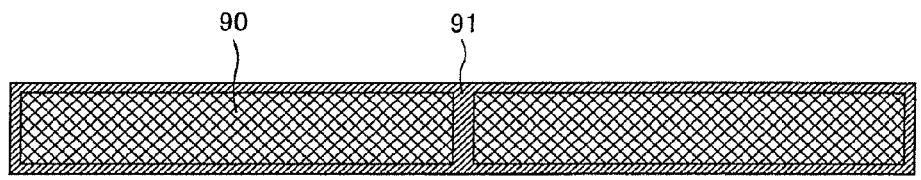
FIG. 13 illustrates another fixed method of the permanent magnet of the permanent magnet electrical rotating machine in the first and the second embodiments of the present invention.

FIGS. 12 and 13 illustrate how the permanent magnet is fixed. Flat-plate permanent magnets 80, which are formed by dividing the flat-plate permanent magnet 3 of the permanent magnet electrical rotating machine in the first and second embodiments into two parts, are fixed with guides 82 attached to permanent magnet slots 81. Alternatively, flat-plate permanent magnets 90, which are also formed by dividing the flat-plate permanent magnet 3 of the permanent magnet electrical rotating machine in the first embodiment into two parts, are fixed with an adhesive 91. When the capacity of a permanent magnet electrical rotating machine is increased, permanent magnets used in it need to be enlarged. Since it is difficult to manufacture large permanent magnets, divided permanent magnets are used and thereby the permanent magnet rotor can be assembled easier.

Third Embodiment

Figure 14:
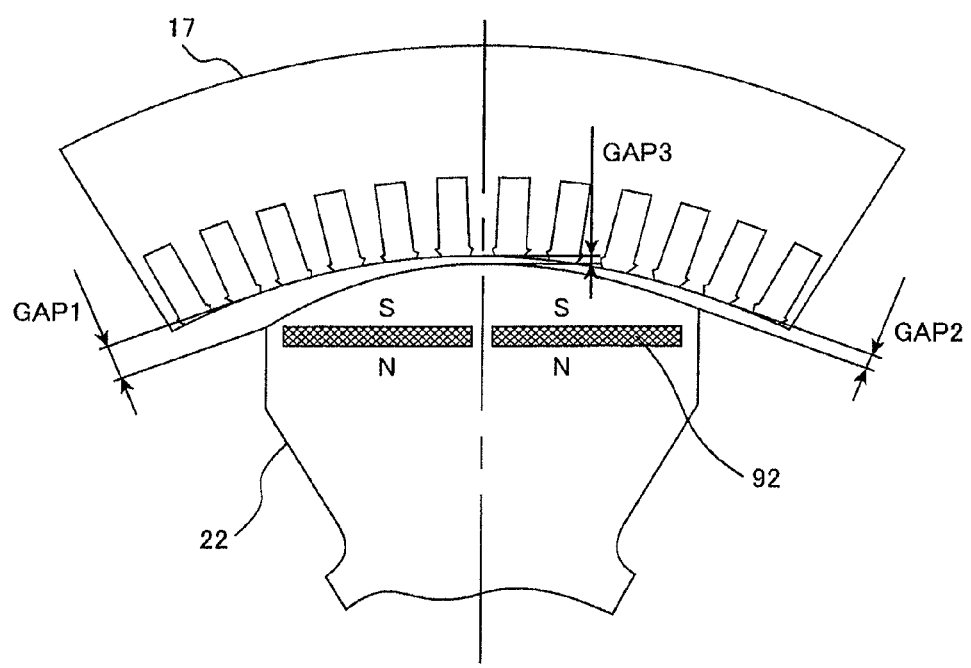
FIG. 14 illustrates a permanent magnet rotor of an permanent magnet electrical rotating machine in a third embodiment of the present invention.

FIG. 14 shows one pole of the permanent magnet rotor of the permanent magnet electrical rotating machine in a third embodiment of the present invention. The rotor iron cores 2 and 21 in the first and second embodiments are changed to a rotor iron core 22 in the third embodiment as shown in FIG. 14, in which the outer periphery of the rotor iron core 22 is not concentric with the inner periphery of the stator 17, and the outer periphery is symmetrical with respect to the center of the periphery for the one pole, so that the waveform of an induced voltage can be readily converted into a sine wave.

That is, in this embodiment in FIG. 14, Gap 1=Gap 2, Gap 1>Gap 3.

Figure 15:
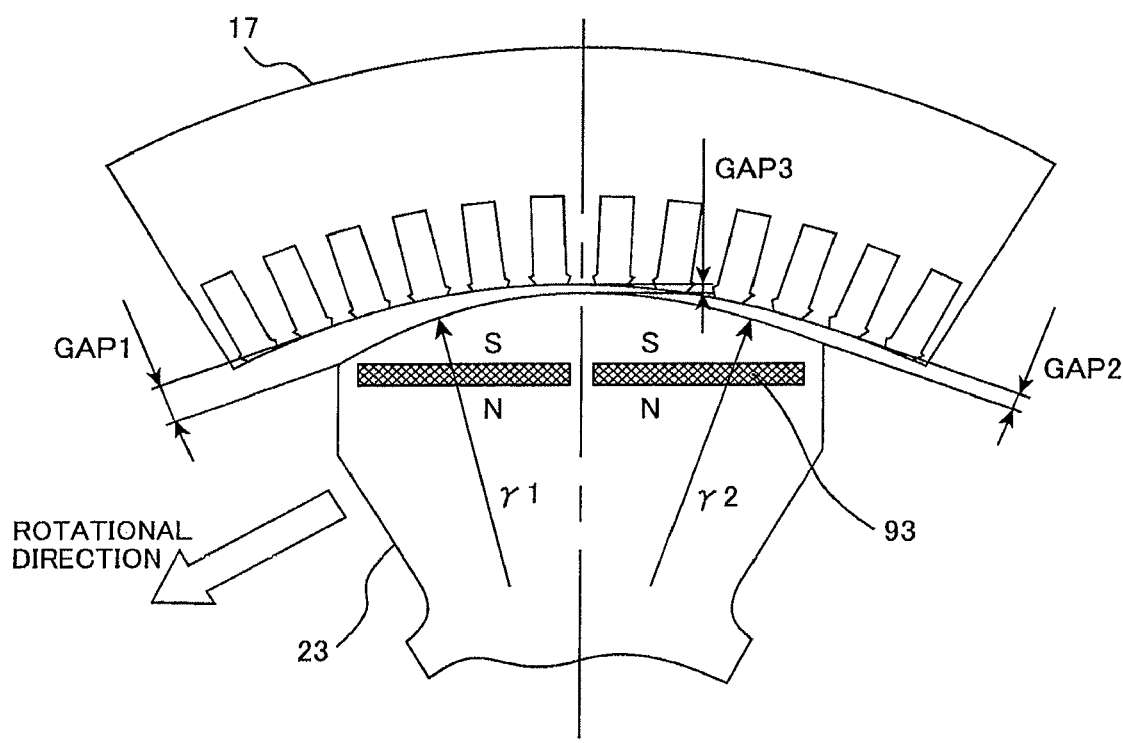
FIG. 15 illustrates another permanent magnet rotor of the permanent magnet electrical rotating machine in the third embodiment of the present invention.

FIG. 15 shows one pole of the permanent magnet rotor of the permanent magnet electrical rotating machine in the third embodiment of the present invention. The rotor iron cores 2 and 21 in the first and second embodiments are changed to a rotor iron core 23 in the third embodiment as shown in FIG. 15, in which the outer periphery of the rotor iron core 23 is not concentric with the inner periphery of the stator 17, and the radius r1 of an outer periphery starting from the center of the periphery for the one pole in the rotational direction is smaller than the radius r2 of another outer periphery starting from the center in a direction opposite to the rotational direction, so that the reaction of the armature can be reduced.

That is, in this embodiment in FIG. 15, Gap 1>Gap 2>Gap 3.

Fourth Embodiment

Figure 16:
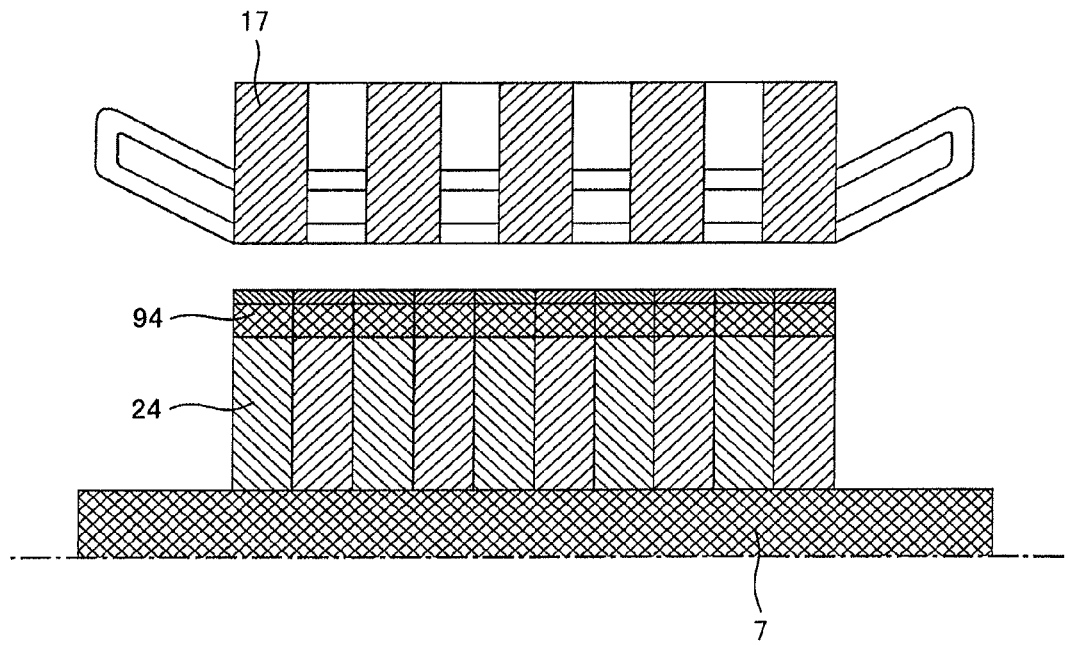
FIG. 16 illustrates a cross-sectional view in the axial direction of an permanent magnet electrical rotating machine in a fourth embodiment of the present invention.

FIG. 16 illustrates a half of the cross-sectional view in the axial direction of the permanent magnet electrical rotating machine in a fourth embodiment of the present invention. In this embodiment, a rotor iron core 24 and permanent magnet 94 of the permanent magnet electrical rotating machine are divided into packets in the axial direction, so that the output of the permanent magnet electrical rotating machine can be adjusted by adjusting the number of packets.

Fifth Embodiment

Figure 17:
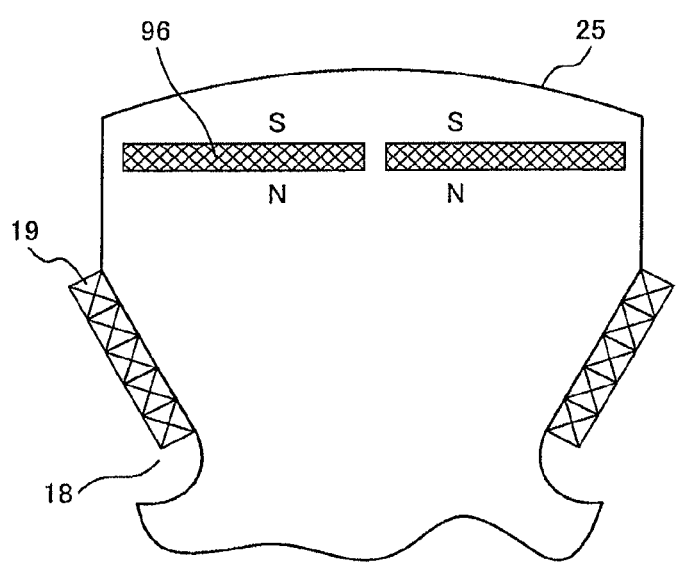
FIG. 17 illustrates a permanent magnet rotor of an permanent magnet electrical rotating machine in a fifth embodiment of the present invention.

FIG. 17 illustrates one pole of the permanent magnet rotor of the permanent magnet electrical rotating machine in a fifth embodiment of the present invention. The rotor iron cores 2 and 21 in the first and second embodiments are changed to a rotor iron core 25 in the fifth embodiment as shown in FIG. 17, in which the groove for airflow cooling formed in a cooling airflow channel 18 is prolonged toward the axial direction, so that a magnetizing coil 19 for magnetizing a permanent magnet can be seated therein.

Sixth Embodiment

Figure 18:
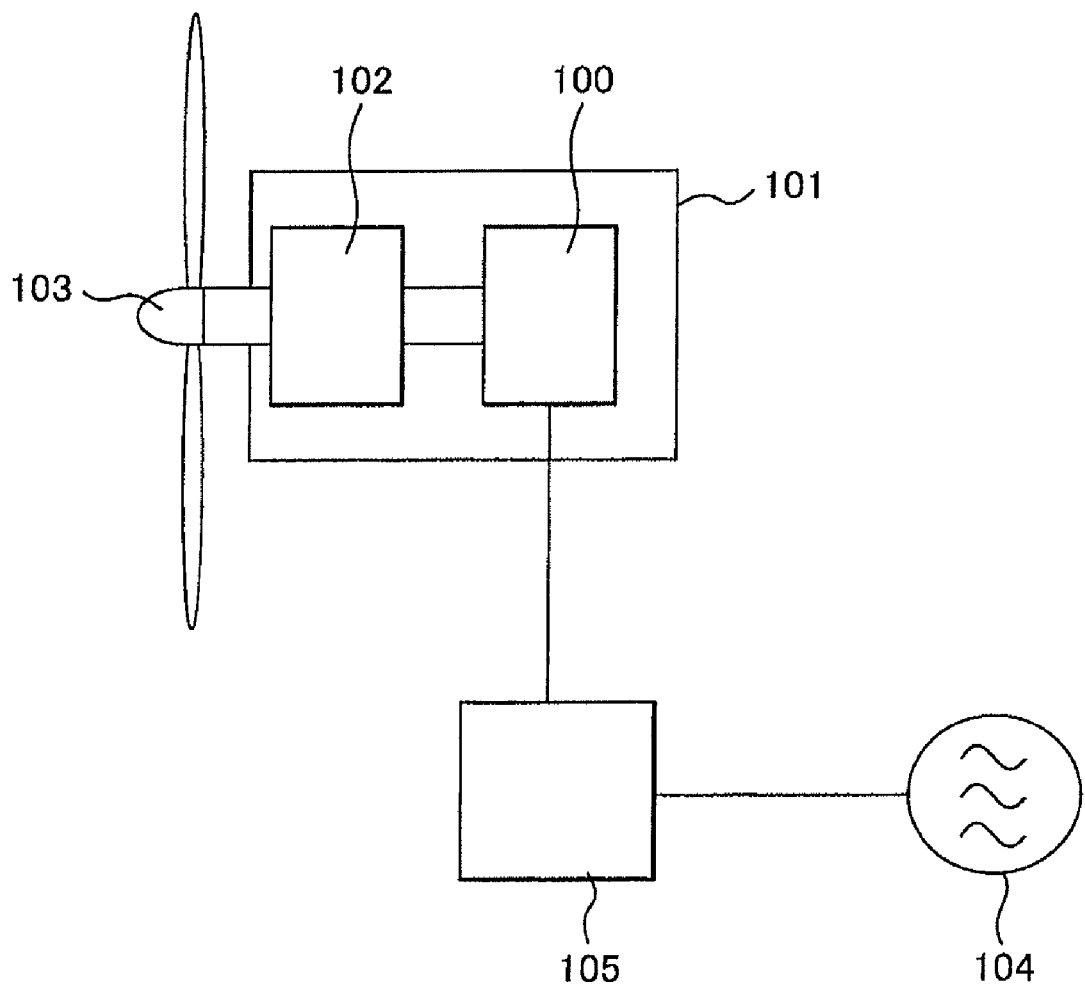
FIG. 18 illustrates a schematic view of a wind power generating system in which an permanent magnet electrical rotating machine of the present invention is applied as a sixth embodiment thereof.

FIG. 18 illustrates a schematic view of a wind power generating system in which an permanent magnet electrical rotating machine of the present invention is applied as a sixth embodiment thereof. In the sixth embodiment, an electrical rotating machine 100 as described in the first to fifth embodiments is connected to a wind mill 103 through a speed-up gear 102, and is accommodated in a nacelle 101. The electrical rotating machine 100 is connected to a power system 104 through a power converter 105 so that an operation for power generation can be carried out. It is also possible to connect the electrical rotating machine 100 directly to the wind mill 103. Although in this embodiment, the permanent magnet electrical rotating machine of the present invention is applied to the wind power generating system in which wind is used as a power source, however the permanent magnet electrical rotating machine of the present invention can be applied to a water mill, an engine, a turbine, and the like sufficiently.

The permanent magnet electrical rotating machine for the wind power generation system in the above embodiment is advantageous in that when the permanent magnet electrical rotating machine has a large capacity, it can be cooled while it is still in a small body.

Accordingly, the present invention can provide a permanent magnet electrical rotating machine enable to be cooled more efficiently and magnetized readily, and enables a permanent magnet rotor to be assembled easily and achieve an inexpensive structure by reduced in size.

What is claimed is:

1. A permanent magnet electrical rotating machine comprising:
a stator;
a rotor disposed to face an inner periphery of the stator with a certain gap,
wherein the rotor comprises a rotor iron core; a plurality of permanent magnet sets disposed in magnet slots of the rotor iron core and arranged along an outer periphery of the rotor iron core to face the inner periphery of the stator with each magnet set provided for each pole so that polarities of the permanent magnet sets change alternately; and a cooling airflow channel formed between adjacent poles on the rotor iron core to circulate airflow and cool the rotor during rotation,
wherein the cooling airflow channel extends to an axial direction of the rotor iron core, and extends from the outer periphery of the rotor iron core, in a radial direction, to a radial center of the rotor iron core;
wherein the cooling airflow channel is provided with a mouth portion in an approximately trapezoidal shape at the outer periphery of the rotor iron core, and a stem portion extended from the mouth portion, in the radial direction, to the radial center of the rotor iron core; and
wherein a width of the mouth portion expands from the stem portion, in the radial direction to the end of the outer periphery of the rotor iron core.

2. The permanent magnet electrical rotating machine according to claim 1, wherein for a width in a peripheral direction on an inner diameter side of the cooling airflow channel, an angle θ formed by ends, on the inner diameter side, of a width of one pole of the rotor iron core is between 50° and 58°.

3. The permanent magnet electrical rotating machine according to claim 1, wherein, when a depth of the cooling airflow channel in the radial direction extending from the outer periphery of the rotor iron core toward the radial center of the rotor iron core is "a" and a radius of the rotor iron core is "r", an optimum ratio (a/r) indicating the depth of the cooling airflow channel relative to the radius of the rotor iron core is between 33% and 58%.

4. The permanent magnet electrical rotating machine according to claim 1, wherein an airflow cooling axial duct is provided inside the permanent magnets in the rotor iron core, extending toward to the axial direction to circulate cooling airflow therein.

5. The permanent magnet electrical rotating machine according to claim 1, wherein an intermediate spacer for airflow cooling of the rotor is provided at an axial center of the rotor iron core or at a position shifted toward an air cooler exhaust side, and a duct piece is disposed in the intermediate spacer to form a duct space for flowing cooling air.

6. The permanent magnet electrical rotating machine according to claim 4, wherein an intermediate spacer for airflow cooling of the rotor is provided at an axial center of the permanent magnet rotor or at a position shifted toward an air cooler exhaust side, and a duct piece is disposed in the intermediate spacer to form a duct spacer for flowing cooling air.

7. The permanent magnet electrical rotating machine according to claim 1, wherein a magnetizing coil is disposed in the cooling airflow channel.

8. The permanent magnet electrical rotating machine according to claim 1, wherein the iron core rotor has at least two flat-plate permanent magnets for each pole in such a way that the flat-plate permanent magnets are disposed in a reverse V shape and identical poles face the outer periphery of the rotor iron core in a radial direction, as viewed from an outer periphery of the iron core rotor.

9. The permanent magnet electrical rotating machine according to claim 1, wherein the iron core rotor has at least two flat-plate permanent magnets for each pole in such a way that the flat-plate permanent magnets are disposed in a V shape and identical poles face the outer periphery of the rotor iron core in a radial direction, as viewed from the outer periphery of the iron core rotor.

10. The permanent magnet electrical rotating machine according to claim 1, wherein the iron core rotor has at least two flat-plate permanent magnets for each pole in such a way that the flat-plate permanent magnets are disposed in parallel and identical poles face the outer periphery of the rotor iron core in a radial direction, as viewed from the outer periphery of the iron core rotor.

11. The permanent magnet electrical rotating machine according to claim 1, wherein the iron core rotor has at least two flat-plate permanent magnets for each pole in such a way that the flat-plate permanent magnets are disposed along a periphery of the iron core rotor and identical poles face the outer periphery of the rotor ion core in a radial direction, as viewed from the outer periphery of the iron core rotor.

12. The permanent magnet electrical rotating machine according to claim 1, wherein, in the iron core rotor, the outer periphery of the rotor iron core is not concentric with the inner periphery of the stator, and the outer periphery of the rotor iron core is symmetrical with respect to the center of the periphery for one pole, so that a waveform of an induced voltage can be converted into a sine wave.

13. The permanent magnet electrical rotating machine according to claim 1, wherein, in the iron core rotor, the outer periphery of the rotor iron core of the rotor is not concentric with the inner periphery of the stator, and a radius of the outer periphery starting from a center of the periphery for one pole in a rotational direction is smaller than a radius of another outer periphery starting from the center in a direction opposite to the rotational direction, so that a reaction of an armature can be reduced.

14. The permanent magnet electrical rotating machine according to claim 1, wherein the rotor iron core and the permanent magnet are divided into packets in an axial direction, so that an output of the electrical rotating machine can be adjusted by adjusting the number of packets.

15. A wind power generating system having a wind mill, an electrical rotating machine, which is accommodated in a nacelle, connected to the wind mill through a speed-up gear, and the electrical rotating machine which is connected to a power system through a power converter, wherein:
the electrical rotating machine is provided with a permanent magnet, which is seated in a slot of a rotor disposed to face an inner periphery of a stator with a certain gap,
the permanent magnet is disposed in a rotor iron core of the rotor along an outer periphery of the rotor iron core to face the inner periphey of the stator, polarities thereof being alternately changed;
a cooling airflow channel is formed between adjacent poles on the rotor iron core, and extends to an axial direction of the rotor iron core and extends from the outer periphery of the rotor iron core, in a radial direction, to a radial center of the rotor iron core; and
a cooling air is introduced in the cooling airflow channel by a fan connected to a shaft of the rotor, so that the cooling airflow channel receives and circulates the cooling air from the fan to the rotor iron core to cool the rotor during rotation, wherein the electrical rotating machine generates electric power in response to rotation of the wind mill in the wind power generating system.

16. The wind power generating system according to claim 15, wherein the cooling airflow channel has a depth extending from the outer periphery of the rotor iron core toward the radial center of the rotor iron core, passing the permanet magnet seated in the slot of the rotor along the outer periphery of the rotor iron core.

17. The wind power generating system according to claim 16, wherein the cooling airflow channel has a depth relative to a radius of the rotor iron core that is within a range of 33% and 58% of the radius of the rotor iron core.

18. The wind power generating system according to claim 15, wherein the rotor further comprises:
an airflow cooling axial duct provided inside the permanent magnet in the rotor iron core, extending toward to the axial direction to circulate cooling airflow therein;
an intermediate spacer provided at an axial center of the rotor iron core or at a position shifted toward an air cooler exhaust side; and
a duct piece disposed in the intermediate spacer to form a duct space for flowing cooling air.

19. The wind power generating system according to claim 15, wherein, in the iron core rotor, the outer periphery of the rotor iron core is not concentric with the inner periphery of the stator, and the outer periphery of the rotor iron core is symmetrical with respect to a center of the periphery for one pole, so that a waveform of an induced voltage can be converted into a sine wave.

20. The wind power generating system according to claim 15, wherein, in the iron core rotor, the outer periphery of the rotor iron core of the rotor is not concentric with the inner periphery of the stator, and a radius of the outer periphery starting from a center of the periphery for one pole in a rotational direction is smaller than a radius of another outer periphery starting from the center in a direction opposite to the rotational direction, so that a reaction of an armature can be reduced.

* * * * *